United States Patent
Luo et al.

(10) Patent No.: US 11,690,056 B2
(45) Date of Patent: *Jun. 27, 2023

(54) TRIGGERING RESOURCE ALLOCATION CONFIGURATION SWITCHING FOR SIDELINK COMMUNICATIONS

(71) Applicant: QUALCOMM Incorporated, San Diego, CA (US)

(72) Inventors: Tao Luo, San Diego, CA (US); Sony Akkarakaran, Poway, CA (US); Jung Ho Ryu, Fort Lee, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,182

(22) Filed: May 20, 2022

(65) Prior Publication Data

US 2022/0279499 A1    Sep. 1, 2022

Related U.S. Application Data

(63) Continuation of application No. 16/912,287, filed on Jun. 25, 2020, now Pat. No. 11,363,602.
(Continued)

(51) Int. Cl.
*H04W 72/044*      (2023.01)
*H04W 24/04*       (2009.01)

(52) U.S. Cl.
CPC ......... *H04W 72/046* (2013.01); *H04W 24/04* (2013.01)

(58) Field of Classification Search
CPC ..... H04B 7/0069; H04B 7/088; H04W 72/02; H04W 72/042; H04W 72/046;
(Continued)

(56) References Cited

U.S. PATENT DOCUMENTS

2015/0045018 A1    2/2015  Liu et al.
2018/0092017 A1    3/2018  Frreda et al.
(Continued)

FOREIGN PATENT DOCUMENTS

WO    WO2019009454 A1    1/2019

OTHER PUBLICATIONS

Intel Corporation: "Offline Summary for NR-V2X Agenda Item—7.2.4.1.4 Resource Allocation Mechanism", 3GPP TSG RAN WG1 Meeting #94, Gothenburg, Sweden, Aug. 20-24, 2018, R1-1809867 (Year: 2018), pp. 1-5.
(Continued)

*Primary Examiner* — Gary Mui
(74) *Attorney, Agent, or Firm* — Holland & Hart / Qualcomm

(57) ABSTRACT

Methods, systems, and devices for wireless communications are described. A user equipment (UE) may establish an access link with a base station using one or more of a first beam or a first set of beams. The UE may therefore receive, via the access link, control signaling indicating a first configuration for a sidelink channel. In some examples, the UE may switch from the first configuration to a second configuration for the sidelink channel based on detection of an event for one or more of the first beam or the first set of beams and communicate with a second UE via the sidelink channel using the second configuration.

30 Claims, 10 Drawing Sheets

Related U.S. Application Data

(60) Provisional application No. 62/867,762, filed on Jun. 27, 2019.

(58) Field of Classification Search
CPC .... H04W 76/19; H04W 76/23; H04L 5/0025; H04L 5/0053; H04L 5/0094
See application file for complete search history.

(56) References Cited

U.S. PATENT DOCUMENTS

| | | |
|---|---|---|
| 2019/0045569 A1 | 2/2019 | Abedini et al. |
| 2019/0124015 A1 | 4/2019 | Loehr et al. |
| 2019/0174530 A1 | 6/2019 | Kim et al. |
| 2019/0289615 A1 | 9/2019 | Lee et al. |
| 2020/0178221 A1 | 6/2020 | Byun et al. |
| 2020/0351975 A1 | 11/2020 | Tseng et al. |
| 2020/0359434 A1 | 11/2020 | Raghavan et al. |
| 2020/0413374 A1 | 12/2020 | Luo et al. |
| 2020/0413393 A1 | 12/2020 | Luo et al. |
| 2021/0014814 A1 | 1/2021 | Akkarakaran et al. |
| 2021/0051638 A1 | 2/2021 | Lu et al. |
| 2021/0219268 A1 | 7/2021 | Li et al. |
| 2022/0022277 A1* | 1/2022 | Zhao .................... H04W 76/14 |

OTHER PUBLICATIONS

International Search Report and Written Opinion—PCT/US2020/039932—ISAEPO—dated Oct. 9, 2020.
NTT Docomo Inc: "Resource Allocation Mechanism", 3GPP TSG RAN WG1 Meeting #94, Gothenburg, Sweden, Aug. 20-24, 2018, R1-1809159 (Year: 2018), pp. 1-7.
ZTE: "Initial Consideration on Nr V2X Resource Allocation", 3GPP Draft, 3GPP TSG-RAN WG2#103bis, R2-1814168, Initial Consideration on NR V2X Resource Allocation, 3rd Generation Partnership Project (3GPP), Mobile Competence Centre, 650, Route Des Lucioles, F-06921, Sophia-Antipolis Cedex, vol. RAN WG2,Sep. 28, 2018 (Sep. 28, 2018), 7 pages, XP051523825, Retrieved from the Internet: URL: http://www.3gpp.org/ftp/tsg%5Fran/WG2%5FRL%TSGR2%5F103bis/Docs/R2%2D1814168%2Ezip, [retrieved on Dec. 11, 2018], Sections 1-3.

* cited by examiner

TRIGGERING RESOURCE ALLOCATION CONFIGURATION SWITCHING FOR SIDELINK COMMUNICATIONS

CROSS REFERENCE

The present Application for Patent is a Continuation of U.S. patent application Ser. No. 16/912,287 by LUO et al., entitled "TRIGGERING RESOURCE ALLOCATION CONFIGURATION SWITCHING FOR SIDELINK COMMUNICATIONS" filed Jun. 25, 2020, which claims the benefit of U.S. Provisional Patent Application No. 62/867,762 by LUO et al., entitled "TRIGGERING RESOURCE ALLOCATION CONFIGURATION SWITCHING FOR SIDELINK COMMUNICATIONS," filed Jun. 27, 2019, assigned to the assignee hereof, and expressly incorporated by reference herein.

FIELD OF TECHNOLOGY

The following relates generally to wireless communications and more specifically to triggering resource allocation configuration switching for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices which may be otherwise known as user equipments (UEs). Some wireless communications systems may support direct communications between multiple communication devices. Examples of direct communications may include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, and the like. As demand for communication efficiency increases, some wireless communications systems may fail to provide satisfactory resource allocation management for sidelink communications, and therefore improved techniques are desired.

SUMMARY

The described techniques relate to improved methods, systems, devices, and apparatuses that support improvements to sidelink communications for vehicle-to-everything (V2X) wireless communications systems, vehicle-to-vehicle (V2V) wireless communications systems, cellular V2X (C-V2X) wireless communications systems, and the like. Some examples of wireless communications systems may enable user equipments (UEs) to support multiple communication links. For example, in fourth generation (4G) systems such as Long Term Evolution (LTE) systems, LTE-Advanced (LTE-A) systems, or LTE-A Pro systems, and fifth generation (5G) systems which may be referred to as New Radio (NR) systems, UEs may support access links (e.g., a Uu interface), which support communications between UEs and base stations (e.g., eNodeB (eNBs), next-generation NodeBs or giga-NodeBs (either of which may be referred to as a gNBs)). Additionally or alternatively, in V2X wireless communications systems, for example, UEs may support sidelinks (e.g., a PC5 interface), which may support direct communication between multiple UEs.

Generally, the described techniques provide for improvements to triggering resource allocation configuration switching for sidelink communications. For example, the described techniques may enable user equipments (UEs) to experience power savings by reducing power consumption relating to sidelink communications and beam failure recovery procedures for access link communications resolution. The described techniques may achieve the above benefits by configuring UEs to switch resource allocation configurations for sidelink communications based on detection of an event related to a directional beam associated with access link communications. As a result, UEs therefore include features for reduced power consumption, improved reliability for sidelink communications, and may promote low latency for sidelink communications, among other benefits.

A method of wireless communications by a first UE is described. The method may include receiving control signaling indicating a first configuration for a sidelink channel, switching from the first configuration to a second configuration for the sidelink channel based on detection of an event for one or more of a first beam or a first set of beams, and communicating with a second UE via the sidelink channel using the second configuration.

An apparatus for wireless communications is described. The apparatus may include a processor, memory coupled with the processor, and instructions stored in the memory. The instructions may be executable by the processor to cause the apparatus to receive control signaling indicating a first configuration for a sidelink channel, switch from the first configuration to a second configuration for the sidelink channel based on detection of an event for one or more of a first beam or a first set of beams, and communicate with a second apparatus via the sidelink channel using the second configuration.

Another apparatus for wireless communications is described. The apparatus may include means for receiving control signaling indicating a first configuration for a sidelink channel, means for switching from the first configuration to a second configuration for the sidelink channel based on detection of an event for one or more of a first beam or a first set of beams, and means for communicating with a second apparatus via the sidelink channel using the second configuration.

A non-transitory computer-readable medium storing code for wireless communications by a first UE is described. The code may include instructions executable by a processor to receive control signaling indicating a first configuration for a sidelink channel, switch from the first configuration to a second configuration for the sidelink channel based on detection of an event for one or more of a first beam or a first set of beams, and communicate with a second UE via the sidelink channel using the second configuration.

In some examples of the method, apparatuses, and non-transitory computer-readable medium described herein, receiving the control signaling may include operations, features, means, or instructions for receiving the control signaling indicating the first configuration that indicates a resource allocation mode for the sidelink channel.

In some examples of the method, apparatuses, and non-transitory computer-readable medium described herein, the resource allocation mode may be a scheduled resource allocation mode for scheduling the sidelink channel or an autonomous resource allocation scheduling mode for scheduling the sidelink channel.

Some examples of the method, apparatuses, and non-transitory computer-readable medium described herein may further include operations, features, means, or instructions for communicating with the second UE via the sidelink channel in the first configuration prior to detection of the event.

In some examples of the method, apparatuses, and non-transitory computer-readable medium described herein, the first configuration may be a scheduled resource allocation configuration and the second configuration may be an autonomous resource allocation scheduling configuration.

In some examples of the method, apparatuses, and non-transitory computer-readable medium described herein, the first configuration may be an autonomous resource allocation scheduling configuration and the second configuration may be a scheduled resource allocation configuration.

Some examples of the method, apparatuses, and non-transitory computer-readable medium described herein may further include operations, features, means, or instructions for detecting a beam failure event for one or more of the first beam or the first set of beams, where the event may be the detected beam failure event.

Some examples of the method, apparatuses, and non-transitory computer-readable medium described herein may further include operations, features, means, or instructions for transmitting a beam failure recovery request for one or more of the first beam or the first set of beams, where the event may be transmission of the beam failure recovery request.

Some examples of the method, apparatuses, and non-transitory computer-readable medium described herein may further include operations, features, means, or instructions for switching from the second configuration to the first configuration for the sidelink channel based on detecting reception of a beam failure recovery request response.

In some examples of the method, apparatuses, and non-transitory computer-readable medium described herein, communicating with the second UE via the sidelink channel in the second configuration may include operations, features, means, or instructions for receiving, from the base station, control information that schedules the sidelink channel, where communicating with the second UE via the sidelink channel may be based on the control information.

Some examples of the method, apparatuses, and non-transitory computer-readable medium described herein may further include operations, features, means, or instructions for transmitting, within a control channel of the sidelink channel, a scheduling message to the second UE based on the control information.

In some examples of the method, apparatuses, and non-transitory computer-readable medium described herein, communicating with the second UE via the sidelink channel in the second configuration may include operations, features, means, or instructions for transmitting, within a control channel of the sidelink channel, scheduling information to the second UE.

Some examples of the method, apparatuses, and non-transitory computer-readable medium described herein may further include operations, features, means, or instructions for autonomously generating the scheduling information.

Some examples of the method, apparatuses, and non-transitory computer-readable medium described herein may further include operations, features, means, or instructions for establishing an access link with a base station using the first beam or the first set of beams and detecting the event based on initiation of a beam failure recovery procedure for the first beam or the first set of beams associated with the access link.

Some examples of the method, apparatuses, and non-transitory computer-readable medium described herein may further include operations, features, means, or instructions for identifying a second beam based on the beam failure recovery procedure, and re-establishing the access link with the base station using the second beam.

Some examples of the method, apparatuses, and non-transitory computer-readable medium described herein may further include operations, features, means, or instructions for transmitting a beam failure recovery request to initiate the beam failure recovery procedure.

Some examples of the method, apparatuses, and non-transitory computer-readable medium described herein may further include operations, features, means, or instructions for detecting the event on at least one of a primary cell, a primary secondary cell, or a secondary cell corresponding to the access link.

In some examples of the method, apparatuses, and non-transitory computer-readable medium described herein, establishing the access link with the base station may include operations, features, means, or instructions for establishing the access link with the base station using a set of beams, where the event may be detected for at least one beam of the set of beams.

In some examples of the method, apparatuses, and non-transitory computer-readable medium described herein, establishing the access link with the base station may include operations, features, means, or instructions for establishing the access link with the base station using a set of beams, where the event may be detected based on initiation of a beam failure recovery procedure for at least one beam of the set of beams.

Some examples of the method, apparatuses, and non-transitory computer-readable medium described herein may further include operations, features, means, or instructions for establishing an access link with the base station using the first beam or the first set of beams.

In some examples of the method, apparatuses, and non-transitory computer-readable medium described herein, where the first beam or the first set of beams comprise one or more beams associated with the sidelink channel.

DETAILED DESCRIPTION

Figure 1:
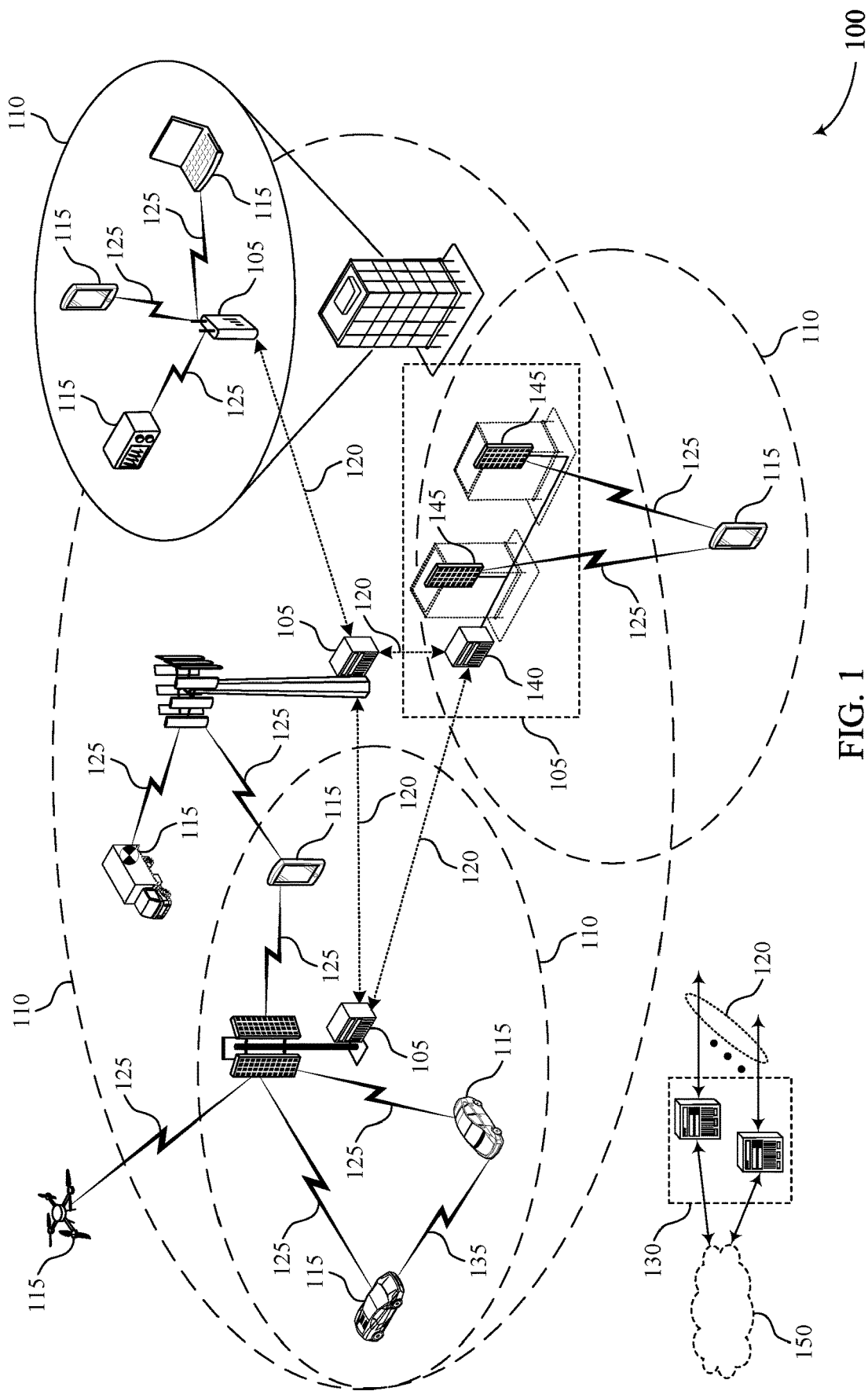
FIGS. 1 and 2 illustrate examples of a wireless communications system in accordance with aspects of the present disclosure.

Some wireless communication systems may have one or more user equipments (UEs) and one or more base stations, for example, next-generation NodeBs or giga-NodeBs (either of which may be referred to as a gNB) that may support one or more multiple radio access technologies including 4G systems such as Long Term Evolution (LTE) systems, fifth generation (5G) systems which may be referred to as New Radio (NR) systems, and Wi-Fi systems (e.g., wireless local area network (WLAN) systems). Additionally or alternatively, UEs may support direct communications between multiple UEs. Examples of direct communications may include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, and the like. As demand for UE power management increases, it may be desirable for UEs to support capabilities for improved sidelink communications that may promote enhanced power conservation for the UEs and reduce latency in wireless communication systems.

In some examples, UEs may establish an access link with one or more base stations for wireless communications in 4G systems, or 5G systems, or both. For example, UEs and base stations may establish access links via a Uu interface, which may allow communications (e.g., control information, data, and the like) between the UEs and the base stations. In some examples, UEs may be equipped with multiple antennas, which may be used to employ techniques such as transmit diversity, receive diversity, multiple-input multiple-output (MIMO) communications, or beamforming. As such, the UEs may establish access links with base stations using beamforming operations for directional communications with base stations. That is, the UEs may establish an access link with base stations using one or more directional beams. Similarly, the UEs may establish sidelinks via a PC5 interface, with other UEs for sidelink communications.

In some examples, UEs may receive control signaling from base stations that may indicate a configuration for a sidelink channel between the UEs. The configuration may be a resource allocation mode for a sidelink channel, such as, for example, a scheduled resource allocation mode for scheduling the sidelink channel or an autonomous resource allocation scheduling mode for scheduling the sidelink channel. In some examples, the UEs may switch configurations for the sidelink channel based on detection of an event associated with the directional communications with base stations. For example, the UEs may determine a beam failure event associated with the directional communications with base stations via an access link and switch configurations for a sidelink. Additionally or alternatively, the UEs may determine a beam failure event associated with the directional communications with other UEs via a sidelink channel and switch configurations for the sidelink channel. The UEs may also consider other event types when determining to switch configurations for a sidelink channel as described herein. By support triggering resource allocation configuration switching for sidelink communications, the UEs may experience reduced power consumption, improved reliability for sidelink communications, and may promote low latency for sidelink communications, among other benefits while resolving other connection issues (e.g. access link issues).

Aspects of the subject matter described herein may be implemented to realize one or more advantages. The described techniques may support improvements in power savings, among other advantages. Aspects of the disclosure are initially described in the context of wireless communications systems. Aspects of the disclosure are then illustrated by and described with reference to a process flow that relates to triggering resource allocation configuration switching for sidelink communications. Aspects of the disclosure are further illustrated by and described with reference to apparatus diagrams, system diagrams, and flowcharts that relate to triggering resource allocation configuration switching for sidelink communications.

FIG. 1 illustrates an example of a wireless communications system 100 in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like. The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs. Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

In some examples, UEs 115 may establish an access link with base stations 105 for wireless communications in 4G systems, or 5G systems, or both. For example, UEs 115 and base stations 105 may establish access links via a Uu interface, which may allow communications (e.g., control information, data, and the like) between UEs 115 and base stations 105. In some examples, UEs 115 may be equipped with multiple antennas, which may be used to employ techniques such as transmit diversity, receive diversity, multiple-input multiple-output (MIMO) communications, or beamforming. As such, UEs 115 may establish access links with base stations 105 using beamforming operations for directional communications with base stations 105. That is, UEs 115 may establish an access link with base stations 105 using one or more directional beams. Similarly, UEs 115 may establish sidelinks via a PC5 interface, with other UEs 115 for sidelink communications.

In some examples, UEs 115 may receive control signaling from base stations 105 that may indicate a configuration for a sidelink channel between UEs 115. The configuration may be a resource allocation mode for a sidelink channel, for example, such as a scheduled resource allocation mode for scheduling the sidelink channel or an autonomous resource allocation scheduling mode for scheduling the sidelink channel. In some examples, UEs 115 may switch configurations for the sidelink channel based on detection of an event associated with the directional communications with base stations 105. For example, UEs 115 may determine a beam failure event associated with the directional communications with base stations 105 and switch configurations for a sidelink. UEs 115 may also consider other event types when determining to switch configurations for a sidelink, as described herein in more detail. By support triggering resource allocation configuration switching for sidelink communications, UEs 115 may experience reduced power consumption, improved reliability for sidelink communications, and may promote low latency for sidelink communications, among other benefits while resolving other connection issues (e.g. access link issues).

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
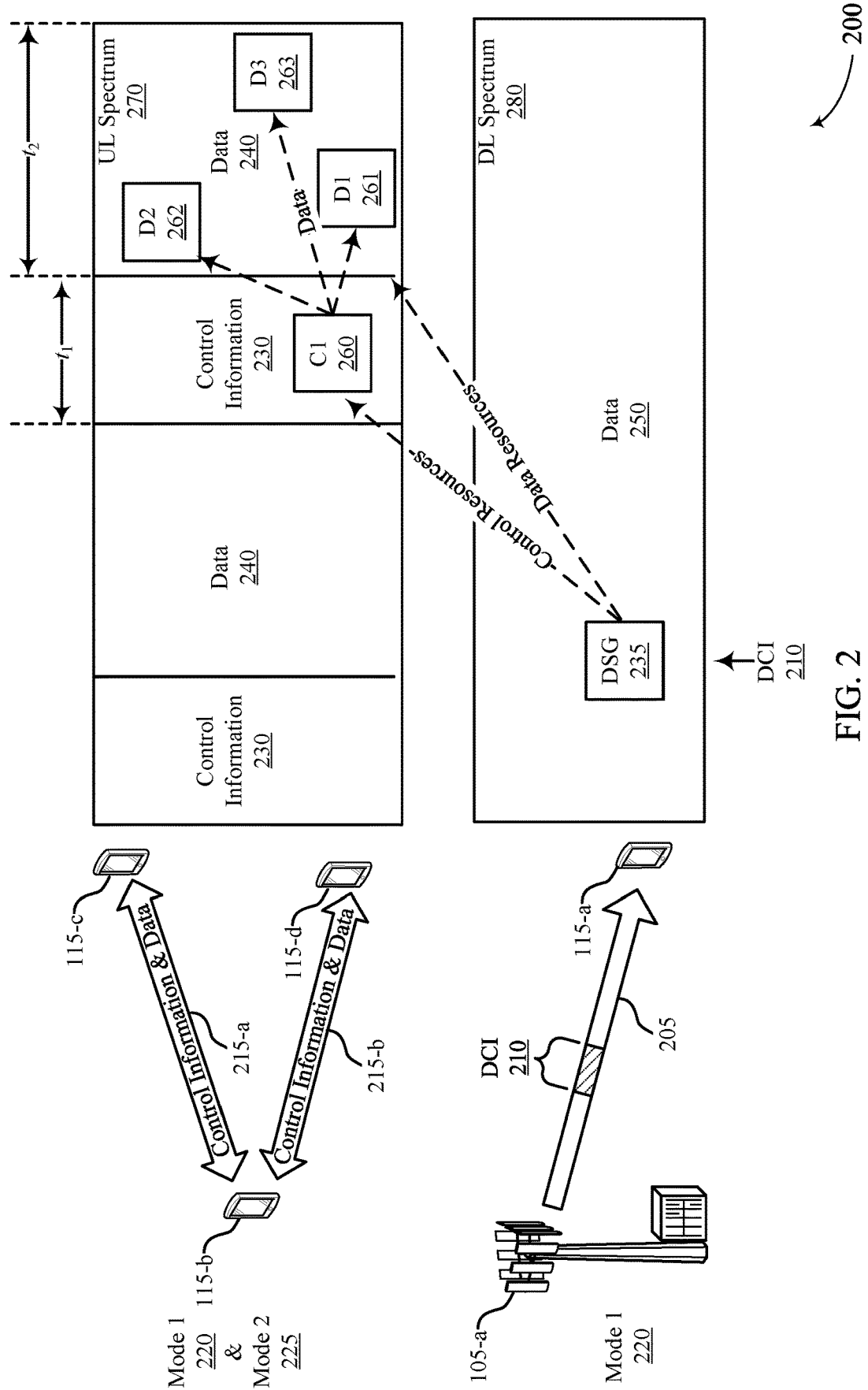

FIG. 2 illustrates an example of a wireless communications system 200 in accordance with aspects of the present disclosure. The wireless communications system 200 may include a base station 105-a and multiple UEs 115 (e.g., UEs 115-a through 115-d), which may be examples of the corresponding devices described with reference to FIG. 1. In some examples, the wireless communications system 200 may implement aspects of the wireless communications system 100. For example, the multiple UEs 115 in the wireless communications system 200 may support sidelink communications using directional (e.g., beamformed) transmissions. The wireless communications system 200 may also support management of sidelink resources by receiving control signaling indicating resources available for sidelink communication and discovery.

In the wireless communications system 200, the base station 105-a may communicate with one or more UEs 115 over an access link 205. In some examples, the access link 205 may be an example of a communication link 125 described with reference to FIG. 1, and may correspond to a radio interface (e.g., a Uu interface) between a UE 115 and a radio access network (e.g., the base station 105). In some examples, the base station 105-a may transmit control information (e.g., including downlink control information (DCI) 210) and data on via downlink transmissions to a UE 115-a over the access link 205. Likewise, the UE 115-a may communicate control information and data to the base station 105-a on via uplink transmissions using the access link 205. In some examples, the access link 205 may be a directional link (e.g., beamformed) between the base station 105-a and the UE 115-a.

Additionally, a UE 115 may utilize a sidelink communication link 215 (e.g., a sidelink channel between two wireless devices) to communicate with another UE 115. In some cases, a UE 115 may be capable of communicating with one or multiple other devices using respective sidelink communication links 215. As an example, a UE 115-b may communicate with a UE 115-c using a first sidelink communication link 215-a, and may also communicate with a UE 115-d using a second sidelink communication link 215-b. UEs 115 that communicate over a sidelink communication link 215 may accordingly transmit control information 230 and data 240 over the sidelink channel. In some examples, the sidelink communication link(s) 215 may correspond to a radio interface between two devices that may not require assistance from a network (such as a PC5 or V2X interface). As described herein, each sidelink communication link 215 may be a directional link between devices, for example, formed using beamforming techniques (such as with mmW communications).

As illustrated in FIG. 2, control information 230 and data may be communicated by each UE 115 over a respective sidelink communication link 215, which may be transmitted using time and frequency resources in an uplink spectrum 270. In some cases, control resources (e.g., control element C1 260) and respective data resources (e.g., data elements D1 261, D2 262, and D3 263) in the uplink spectrum 270 may be used for communications over a sidelink. In some cases, resources in the uplink spectrum 270 may be optionally configured or scheduled by the base station 105-a. For instance, the base station 105-a may transmit a downlink scheduling grant (DSG) 235 and data 250 via a downlink spectrum 280, where the DSG 235 may include an indication of control resources and data resources that may be used by the one or more UEs 115 (e.g., for sidelink communications). In other cases, the resources used to transmit the control information 230 and data may be determined from a set of resources configured for sidelink communications. In some cases, the resources used for control information 230 and data 240 in uplink spectrum may span different time periods (or symbol periods). As an illustrative example, the resources used for the control information 230 may include a first time period, t1 (e.g., 4 ms), whereas the resources used for both the control information 230 and data 240 may include a second time period, t2, that is greater than the first time period (e.g., 160 ms).

Sidelink communications in the wireless communications system 200 may be performed by various UEs 115 using different sidelink modes (e.g., using a first sidelink mode 220, a second sidelink mode 225, or a combination thereof). As an example, the first sidelink mode 220 may be an example of scheduled mode, where the base station 105-a may indicate to the one or more UEs 115 which resources may be utilized for sidelink communications. A transmitting UE 115 (e.g., the UE 115-a) may receive information about an allocated beam from the base station 105-a in accordance with the first sidelink mode 220. The second sidelink mode 225 may be an example of an autonomous mode, where a UE 115 may determine which resources to use for a sidelink channel. In such cases, the resources may be selected, for example, from a set of preconfigured sidelink resources. Here, a UE 115 (e.g., the UE 115-b, the UE 115-c, and/or the UE 115-d) may autonomously determine which transmitting beam to utilize in the second sidelink mode 225. This determination may be partially based on preconfigured QCL information, for example, a set of beams from which to select a transmitting beam. In some cases, a receiving UE 115 (e.g., the UE 115-b, the UE 115-c, or the UE 115-d) may receive data or control information via a beam indicated via a controlling the base station 105-a (in the first sidelink mode 220) or by the UE 115-a (e.g., in the second sidelink mode 225), or a combination thereof.

In some examples, the one or more UEs 115 may support triggering resource allocation configuration switching for sidelink communications to experience reduced power consumption, improved reliability for sidelink communications, and may promote low latency for sidelink communications, among other benefits. An exemplary triggering resource allocation configuration switching for sidelink communications is further described in more detail herein with reference to FIG. 3.

Figure 3:
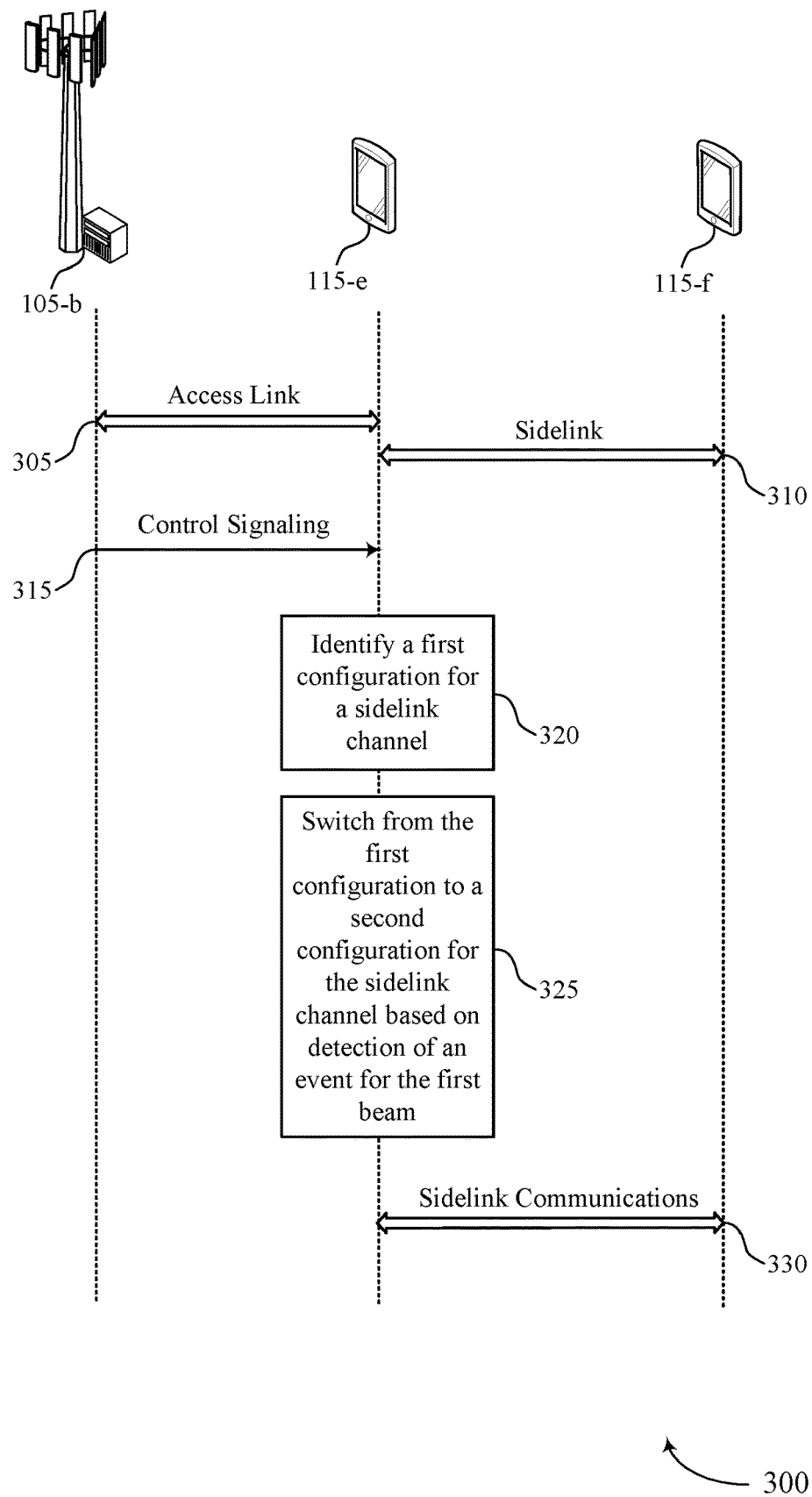
FIG. 3 illustrates an example of a process flow in accordance with aspects of the present disclosure.

FIG. 3 illustrates an example of a process flow 300 in accordance with aspects of the present disclosure. The process flow 300 may implement aspects of the wireless communications system 100 and 200, as described with reference to FIGS. 1 and 2. For example, the process flow 300 may be based on a configuration by a base station 105 or a UE 115, and implemented by the UE 115 for reduced power consumption, improved reliability for sidelink communications, and may promote low latency for sidelink communications, among other benefits. The process flow 300 may include a base station 105-b and multiple UEs 115-e, 115-f, which may be examples of devices as described with reference to FIGS. 1 and 2. In the following description of the process flow 300, the operations between the base station 105-b, the UE 115-e, and the UE 115-f may be transmitted in a different order than the example order shown, or the operations performed by the base station 105-b, the UE 115-e, and the UE 115-f may be performed in different orders or at different times. Some operations may also be omitted from the process flow 300, and other operations may be added to the process flow 300.

At 305, the process flow 300 may commence with the base station 105-b and the UE 115-e establishing an access link. For example, the base station 105-b and the UE 115-e may establish an access link via a Uu interface, which may allow communications (e.g., control information, data, and the like) between the base station 105-b and the UE 115-e. The base station 105-b and the UE 115-e may establish an access link according to a connection procedure, such as a random access procedure (e.g., a two-step random access procedure, a four-step random access procedure). In some examples, the base station 105-b may establish an access link with the UE 115-e using a directional beam. Similarly, the UE 115-e may establish an access link with the base station 105-b using a directional beam. In some examples, a directional beam of the base station 105-b may have a beam correspondence with a directional beam of the UE 115-e. For example, a directional beam of the base station 105-b and a directional beam of the UE 115-e may form a directional beam pair (e.g., a downlink directional beam and an uplink directional beam pair). Additionally or alternatively, the UE 115-e may establish the access link using a set of directional beams (e.g., more than one directional beam). Different directional beams may be created using a single array or panel of antennas, or using different arrays or panels.

At 310, the process flow 300 may proceed with the UEs 115-e, 115-f establishing a sidelink. For example, the UEs 115-e, 115-f may establish a sidelink via a PC5 interface, which may allow communications (e.g., control information, data, and the like) between the UEs 115-e, 115-f. In some examples, for sidelink communications, the UEs 115-e, 115-f may operate according to a scheduled mode or an autonomous mode for resource allocation. Additionally or alternatively, the UEs 115-e, 115-f may be in a non-standalone mode or a standalone mode with respect to the base station 105-b. A non-standalone mode may include an evolved universal terrestrial radio (EUTRA) NR dual connectivity (EN-DC) mode. Here, for example, a master cell group (MCG) may support 4G systems, such as LTE systems, while a secondary cell group (SCG) may support a 5G system such as NR in a frequency range 1 (FR1) band, a frequency range 2 (FR2) band, frequency range 3 (FR3) band (e.g., with carrier frequencies spanning 6 GHz-24.5 GHz) or frequency range 4 (FR4) band (e.g., with carrier frequencies above 52.6 GHz), or any combination thereof.

In some examples, depending on a condition (also referred to as an event) of the access link (e.g., a radio condition of a Uu interface), the UEs 115-e, 115-f may switch from a scheduled mode to an autonomous mode or vice-versa. In some examples, for multiple beam operations, for example, in higher radio frequency bands, the UEs 115-e, 115-f may be configured to perform one or more physical layer procedures. For example, the UEs 115-e, 115-f may perform link reconfiguration (e.g., a beam failure recovery procedure) to detect a beam failure event, identify a new directional beam, and transmit a beam failure recovery request to the base station 105-b. A beam failure procedure may be configured for one or multiple cells, for example, a primary cell, a primary secondary cell, or a secondary cell. In some examples, additional events may be defined to trigger a resource allocation mode switching, for example, such as when a beam failure event has been detected in one or more cells, or when the UEs 115-*e*, 115-*f* are in beam failure recovery in one or more cells (e.g., transmitting beam failure recovery request signals or waiting for a response from base station 105-*b*).

At 315, the base station 105-*b* may transmit control signaling to the UE 115-*e*. For example, the base station 105-*b* may transmit downlink control information to the UE 115-*e*, or a medium access control (MAC) control element (MAC-CE) or an RRC message. At 320, the UE 115-*e* may identify a first configuration for a sidelink channel, for example, based on the control signaling. The control signaling including the first configuration may indicate a resource allocation mode for the sidelink channel between the UEs 115-*e*, 115-*f*. The resource allocation mode may be a scheduled resource allocation mode for scheduling the sidelink channel or an autonomous resource allocation scheduling mode for scheduling the sidelink channel.

At 325, the UE 115-*e* may switch from the first configuration to a second configuration for the sidelink channel based on detection of an event for a directional beam used for communication with the base station 105-*b*. In some examples, the UE 115-*e* may communicate with the UE 115-*f* via the sidelink channel in the first configuration prior to detection of the event. For example, the UE 115-*e* may transmit, within a control channel of the sidelink channel, scheduling information to the UE 115-*f*. In some examples, the UE 115-*e* may autonomously generate the scheduling information. The first configuration may be a scheduled resource allocation configuration and the second configuration may be an autonomous resource allocation scheduling configuration. Alternatively, the first configuration may be an autonomous resource allocation scheduling configuration and the second configuration may be a scheduled resource allocation configuration.

In some examples, the UE 115-*e* may detect an event for the directional beam used for communication with the base station 105-*b*. Here, the event may be the detected beam failure event. Additionally or alternatively, in some examples, detection of a beam failure event by the UE 115-*e* may include identifying that a particular action has occurred or a determination has been made to perform a particular action (e.g., identify a need to perform a particular action), such as the UE 115-*e* identifying transmission of a beam failure recovery request, or has determined to transmit the beam failure recovery request, for the directional beam used for communication with the base station 105-*b*. As such, the detected event may be the transmission of, or a determination to transmit, the beam failure recovery request (e.g., determine to transmit a beam failure recovery request, for example, based on a beam quality falling below a threshold, etc.). The UE 115-*e* may, therefore, switch from the second configuration to the first configuration for the sidelink channel based on detecting reception of a beam failure recovery request response (e.g., from base station 105-*b*). In some examples, the beam failure event may be a determination by the UE 115-*e* of a signal strength metric not satisfying a threshold. The signal strength metric may be, for example, a reference signal received power measurement, a reference signal received quality measurement, a signal to noise ratio, a signal to interference plus noise ratio (SINR), a hypothetical physical downlink control channel (PDCCH) block error rate (BLER), or the like, or any combination thereof.

In some examples, the UE 115-*e* may detect a beam failure event for the sidelink channel used for directional communication with the UE 115-*f*. In some examples, detection of a beam failure event by the UE 115-*e* may include identifying that a particular action has occurred or a determination has been made to perform a particular action (e.g., identify a need to perform a particular action), such as the UE 115-*e* identifying transmission of a beam failure recovery request, or has determined to transmit the beam failure recovery request, for the directional beam used for the directional communication with the UE 115-*f*. Additionally or alternatively, the UE 115-*f* may identify transmission of a beam failure recovery request or may determine to transmit the beam failure recovery request. Accordingly, the UE 115-*f* may receive a beam failure recovery request from the UE 115-*f* and may determine to switch sidelink configurations based on the received beam failure request.

A beam failure event identified on the access link may indicate an event such as a beam blockage, which may hinder the reliable reception of downlink messages such as DCI grants that schedule resources for sidelink communication in the scheduled mode of sidelink operation. Thus, it may be preferable to switch instead to autonomous mode where such DCI grants may be transmitted less frequently on the downlink. Similarly, such beam blockage may be correlated with the potential for beam blockage on the sidelink as well (e.g., if the blocker is located close to the UEs 115), which may motivate increased beam-sweeping transmissions (e.g., more beams, or reduced period for periodic beam sweeping) on the sidelink, as a pre-emptive measure against potential sidelink beam blockage. As such, it may be desirable to trigger certain changes in sidelink configuration, such as scheduling mode (scheduled or autonomous), or sidelink reference signal configuration (periodicity, number of beams, etc.) in response to beam-failure related events. In some examples, the changes may be made by reconfiguration messages from the base station 105-*b*.

In a non-standalone mode, such as EN-DC, reconfiguration messages may potentially be transmitted over an anchor carrier (e.g., such as LTE) and thus avoid the potential decrease in reliability of their transmission caused by the beam-failure. However, in standalone operation, those messages may be carried on the same link that suffered the beam-failure, and hence it may be preferable to avoid such explicit reconfiguration and instead may automatically or implicitly trigger such changes based on the beam-failure event. In some examples, LTE sidelink operation may support mode switching triggering based on events related to operations of radio-link-failure (RLF) related timers such as (e.g., timer 310 (T310), timer 311 (T311), etc.). RLF procedures may introduce unwanted latency (e.g. may be slower or more long-term relative) to beam-failure recovery (BFR) procedures, and for beam-based operation such as in millimeter-wave bands, faster response times to such events may be desirable. It may thereby be desirable to support event triggers based on BFR as well. In some examples, a BFR may be triggered (e.g., exclusively) when all the relevant configured beams fail (e.g., their measured quality metric falls below the defined threshold). However, it may also be possible to define a partial beam failure recovery procedure, which may involve replacing a failing beam or beams while still continuing the connection using the beams that have not yet failed. Such procedures could also serve as event triggers for sidelink reconfiguration. The configuration changes triggered may be different for full BFR as compared to partial BFR, and the changes for partial BFR may be a function of how many beams failed.

In some examples, such as in LTE sidelink operation, there may be a distinction between scheduled mode (mode1) and autonomous mode (mode2) for sidelink data transmission, and scheduled mode (type 2B) and autonomous mode (type 1) for sidelink discovery signal transmission. The scheduling in the scheduled mode may be via DCI in case of sidelink data (mode1), and via RRC configuration in case of sidelink discovery mode (type 2B). The BFR based mode switching, described herein, may support one or both of sidelink data and discovery, with possibly different parameters if applied to both. For example, sidelink data mode switching may be triggered under both full and partial BFR, whereas sidelink discovery mode switching may be triggered exclusively under full BFR. A motivation for such operation may be that the scheduling updates transmitted on the access link in the scheduled mode may typically be less frequent for sidelink discovery (where the updates are transmitted via RRC signaling) as compared to sidelink data transmission (where updates are via DCI).

In some examples, the UE 115-e may detect the event based on initiation of a beam failure recovery procedure for the access link. The UE 115-e may therefore identify a different directional beam to use for communication with the base station 105-b. For example, the UE 115-e may identify a different directional beam based on the beam failure recovery procedure, and re-establish the access link with the base station 105-b using the different directional beam. In some examples, the UE 115-e may transmit a beam failure recovery request to initiate the beam failure recovery procedure to re-establish the access link with base station 105-b. At 330, the UEs 115-e, 115-f may continue to communicate via the sidelink channel using the second configuration. In some examples, the UE 115-e may receive, from the base station 105-b, control information that schedules the sidelink channel, where communicating with the UE 115-f via the sidelink channel may be based on the control information. The UE 115-e may transmit, within a control channel of the sidelink channel, a scheduling message to the UE 115-f based on the control information.

Accordingly, for an access link (e.g. Uu interface), the event that may be a detection of beam failure by the UE 115-e, or transmission of indication for a BFR by the UE 115-e. Alternatively, for a sidelink channel, the UE 115-e may act as the base station 105-b of the Uu interface and the UE 115-f may act as the UE 115-e of the Uu interface. In some examples, there may be a bidirectional beam failure detection (BFD) and BFR, where on a different set of resources, the UE 115-f acts like the base station 105-b and the UE 115-e like the UE 115-f of Uu. Thus, for sidelink the event at the UE 115-e could be, in addition to detection of beam failure and transmission of BFR indication by the UE 115-e as in Uu, also now receipt of BFR indication from the UE 115-f.

The operations performed by the base station 105-b, the UE 115-e, and the UE 115-f as part of, but not limited to, the process flow 300 may provide improvements to sidelink communications. Furthermore, the operations performed by the base station 105-b, the UE 115-e, and the UE 115-f as part of, but not limited to, the process flow 300 may provide benefits and enhancements to the operation of the UEs 115-e, 115-f. For example, by supporting resource allocation configuration mode switching for sidelink communications, the operational characteristics, such as power consumption related to sidelink communications may be reduced. The operations performed by the base station 105-b, the UE 115-e, and the UE 115-f as part of, but not limited to, the process flow 300 may also provide efficiency to the UEs 115-e, 115-f by reducing latency associated with processes related to sidelink communications and beam failure recovery procedures.

Figure 4:
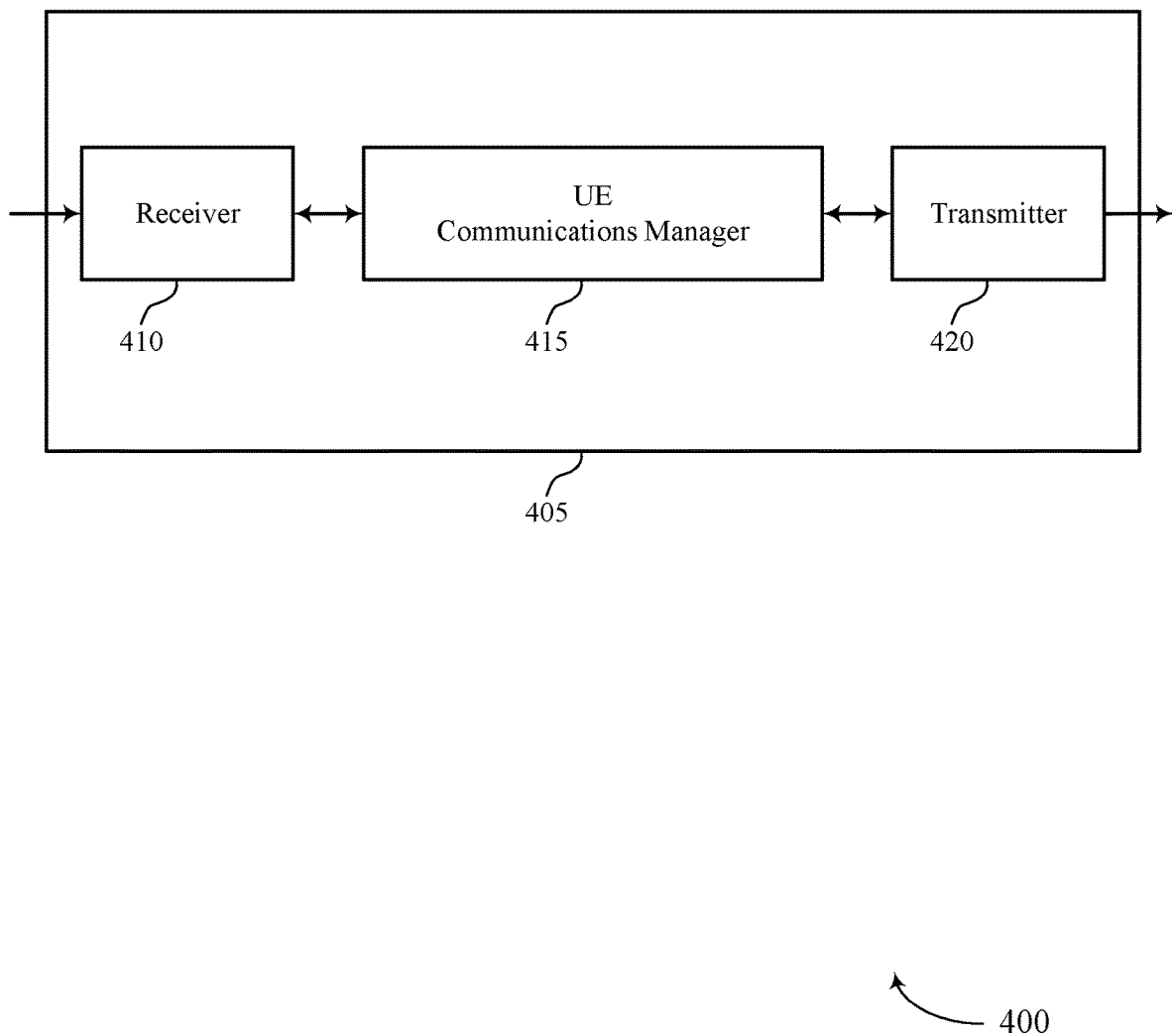
FIGS. 4 and 5 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to wireless communication systems, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may be implemented as an integrated circuit or chipset for a modem of the device 405, and the receiver 410 and the transmitter 420 may be implemented as analog components (e.g., amplifiers, filters, antennas) coupled with the modem of the device 405 to enable wireless transmission and reception (e.g., transmission and reception of sidelink communications). The UE communications manager 415 may be implemented to realize one or more potential improvements. At least one implementation may enable the UE communications manager 415 to trigger resource allocation configuration switching for sidelink communications. Based on implementing the resource allocation configuration, one or more processors of the device 405 (e.g., processor(s) controlling or incorporated with the UE communications manager 415) may experience reduce power consumption relating to sidelink communications and beam failure recovery procedures for access link communications resolution. One or more processors of the device 405 (e.g., processor(s) controlling or incorporated with the UE communications manager 415) may also promote high reliability and low latency sidelink communications by switching resource allocation configurations for the sidelink communications based on detection of an event related to a directional beam associated with access link communications, among other benefits. For example, the UE communications manager 415 may establish an access link with a base station using one or more of a first beam or a first set of beams, receive, via the access link, control signaling indicating a first configuration for a sidelink channel, switch from the first configuration to a second configuration for the sidelink channel based on detection of an event for one or more of the first beam or the first set of beams, and communicate with a second UE via the sidelink channel using the second configuration. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
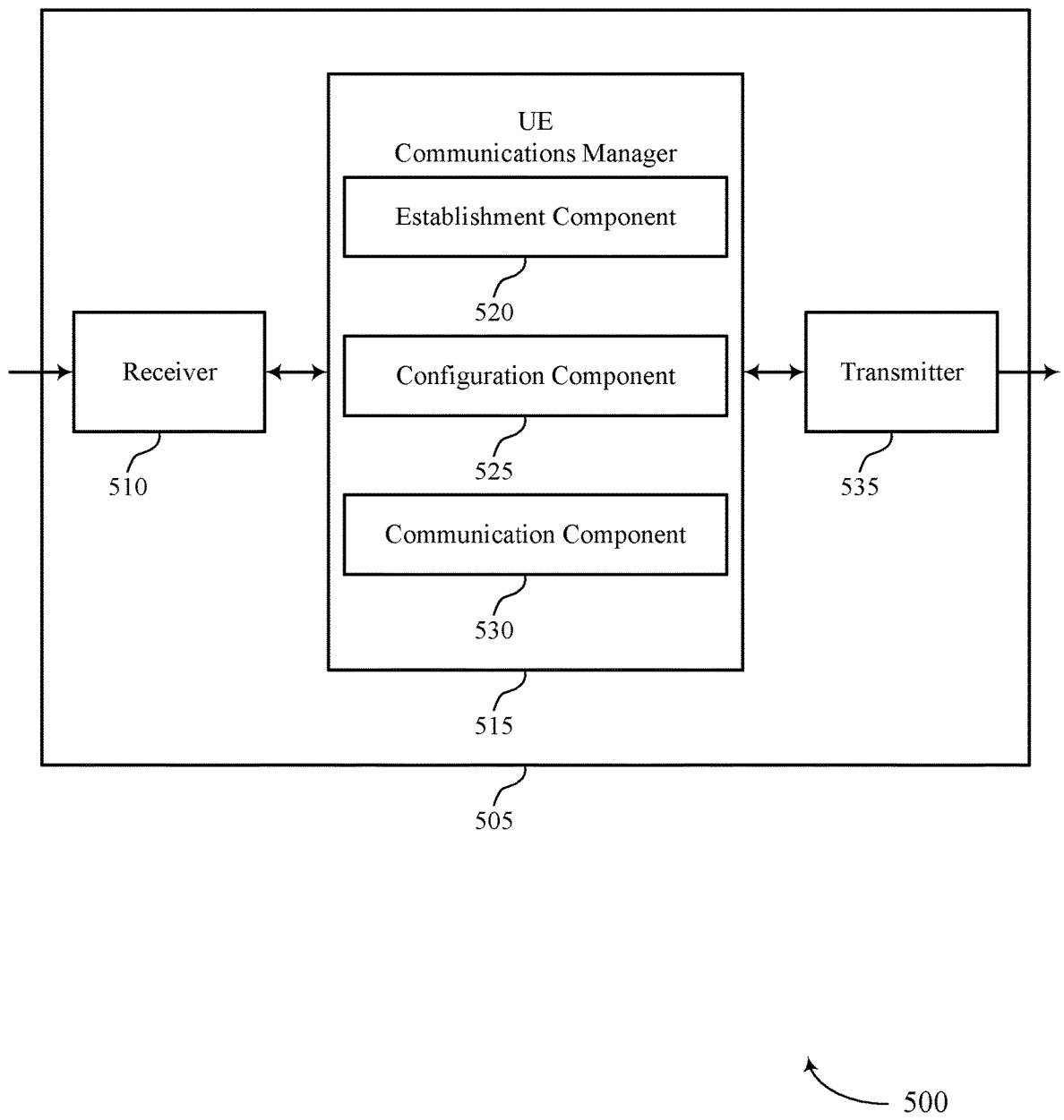

FIG. 5 shows a block diagram 500 of a device 505 in accordance with aspects of the present disclosure. The device 505 may be an example of aspects of a device 405, or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to wireless communication systems, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include an establishment component 520, a configuration component 525, and a communication component 530. The UE communications manager 515 may be an example of aspects of the UE communications manager 710 described herein. The establishment component 520 may establish an access link with a base station using one or more of a first beam or a first set of beams. The configuration component 525 may receive, via the access link, control signaling indicating a first configuration for a sidelink channel and switch from the first configuration to a second configuration for the sidelink channel based on detection of an event for one or more of the first beam or the first set of beams. The communication component 530 may communicate with a second UE via the sidelink channel using the second configuration.

The transmitter 535 may transmit signals generated by other components of the device 505. In some examples, the transmitter 535 may be collocated with a receiver 510 in a transceiver component. For example, the transmitter 535 may be an example of aspects of the transceiver 720 described with reference to FIG. 7. The transmitter 535 may utilize a single antenna or a set of antennas.

Figure 6:
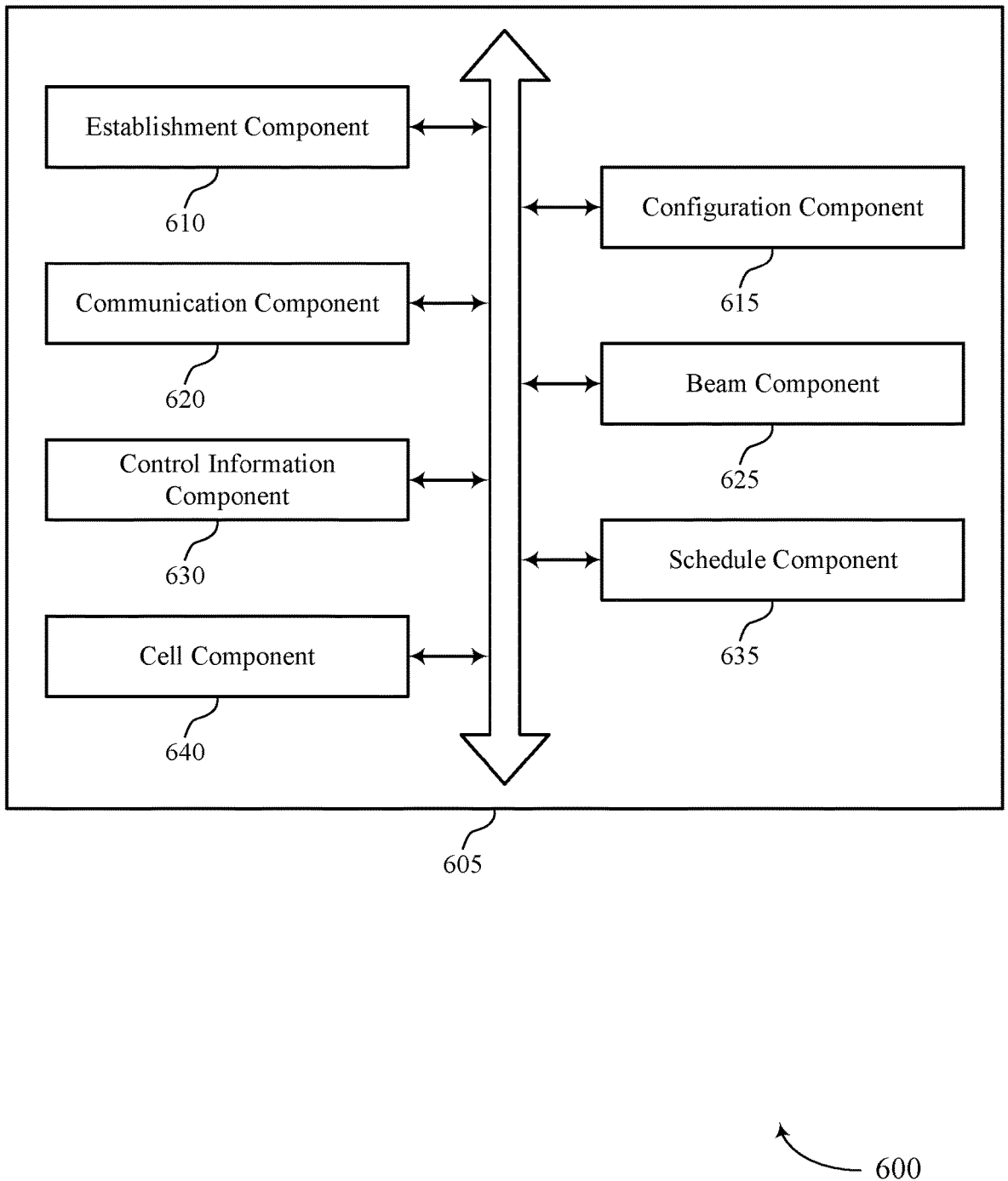
FIG. 6 shows a block diagram of a UE communications manager in accordance with aspects of the present disclosure.

FIG. 6 shows a block diagram 600 of a UE communications manager 605 in accordance with aspects of the present disclosure. The UE communications manager 605 may be an example of aspects of a UE communications manager 415, a UE communications manager 515, or a UE communications manager 710 described herein. The UE communications manager 605 may include an establishment component 610, a configuration component 615, a communication component 620, a beam component 625, a control information component 630, a schedule component 635, and a cell component 640. Each of these components may communicate, directly or indirectly, with one another (e.g., via one or more buses).

The establishment component 610 may establish an access link with a base station using one or more of a first beam or a first set of beams. In some examples, the establishment component 610 may establish the access link with the base station using a set of beams, where the event may be detected for at least one beam of the set of beams. In some examples, the establishment component 610 may establish the access link with the base station using a set of beams, where the event is detected based on initiation of a beam failure recovery procedure for at least one beam of the set of beams.

The configuration component 615 may receive, via the access link, control signaling indicating a first configuration for a sidelink channel. In some examples, the configuration component 615 may switch from the first configuration to a second configuration for the sidelink channel based on detection of an event for one or more of the first beam or the first set of beams. In some examples, the configuration component 615 may receive the control signaling indicating the first configuration that indicates a resource allocation mode for the sidelink channel. In some cases, the resource allocation mode is a scheduled resource allocation mode for scheduling the sidelink channel or an autonomous resource allocation scheduling mode for scheduling the sidelink channel. In some cases, the first configuration is a scheduled resource allocation configuration and the second configuration is an autonomous resource allocation scheduling configuration. In some cases, the first configuration is an autonomous resource allocation scheduling configuration and the second configuration is a scheduled resource allocation configuration.

The communication component 620 may communicate with a second UE via the sidelink channel using the second configuration. In some examples, the communication component 620 may communicate with the second UE via the sidelink channel in the first configuration prior to detection of the event. The beam component 625 may detect a beam failure event for one or more of the first beam or the first set of beams, where the event is the detected beam failure event. In some examples, the beam component 625 may transmit a beam failure recovery request for one or more of the first beam or the first set of beams, where the event is transmitting the beam failure recovery request. In some examples, the beam component 625 may switch from the second configuration to the first configuration for the sidelink channel based on detecting reception of a beam failure recovery request response. In some examples, the beam component 625 may detect the event based on initiation of a beam failure recovery procedure for the access link. In some examples, the beam component 625 may identify a second beam based on the beam failure recovery procedure. In some examples, the beam component 625 may re-establish the access link with the base station using the second beam. In some examples, the beam component 625 may transmit a beam failure recovery request to initiate the beam failure recovery procedure.

The control information component 630 may receive, from the base station, control information that schedules the sidelink channel, where communicating with the second UE via the sidelink channel is based on the control information. The schedule component 635 may transmit, within a control channel of the sidelink channel, a scheduling message to the second UE based on the control information. In some examples, the schedule component 635 may transmit, within a control channel of the sidelink channel, scheduling information to the second UE. In some examples, the schedule component 635 may autonomously generate the scheduling information. The cell component 640 may detect the event on at least one of a primary cell, a primary secondary cell, or a secondary cell corresponding to the access link.

Figure 7:
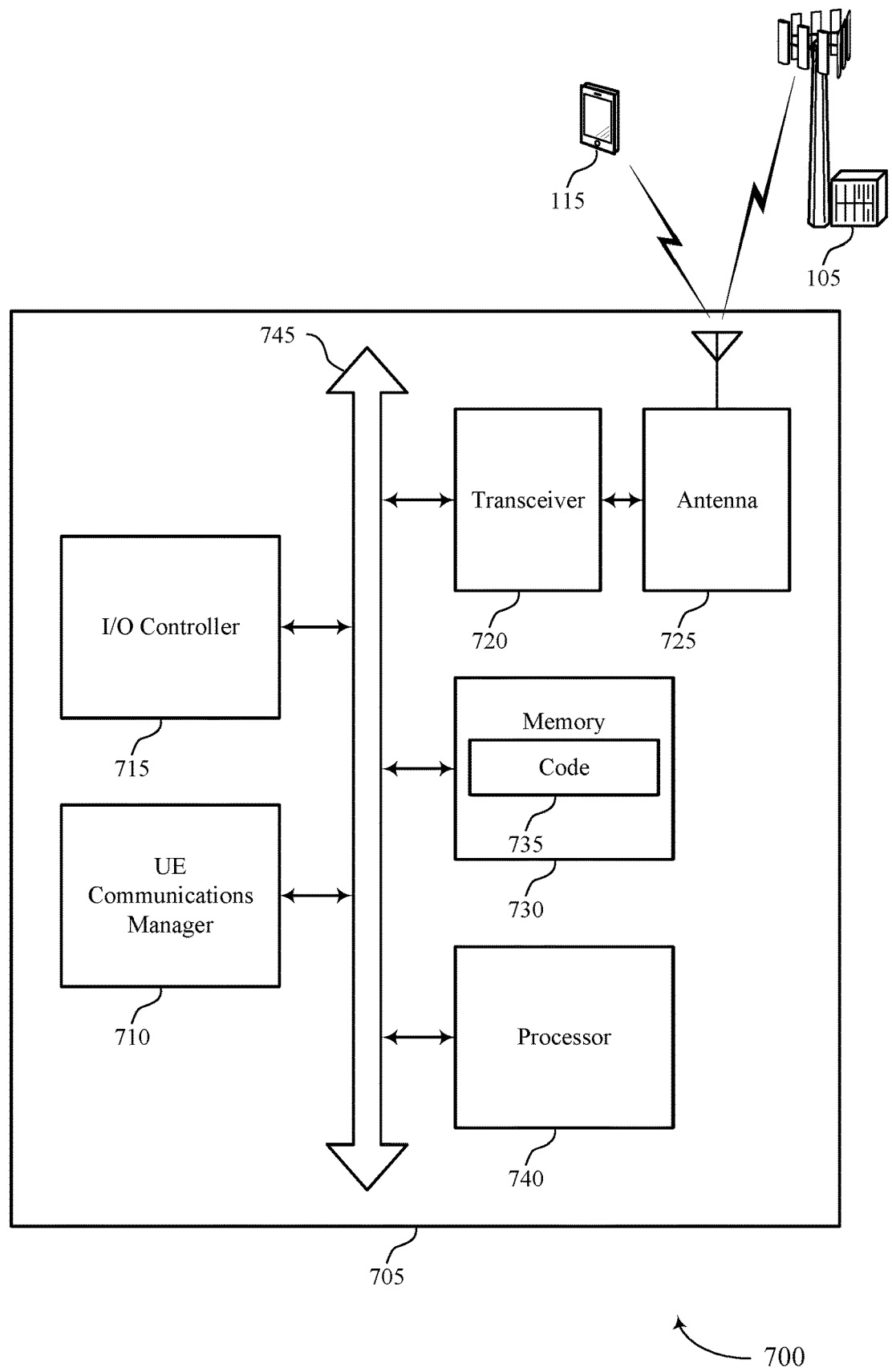
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

At least one implementation may enable the UE communications manager 710 to trigger resource allocation configuration switching for sidelink communications. Based on implementing the resource allocation configuration, one or more processors of the device 705 (e.g., processor(s) controlling or incorporated with the UE communications manager 710) may experience reduce power consumption relating to sidelink communications and beam failure recovery procedures for access link communications resolution. One or more processors of the device 705 (e.g., processor(s) controlling or incorporated with the UE communications manager 710) may also promote high reliability and low latency sidelink communications by switching resource allocation configurations for the sidelink communications based on detection of an event related to a directional beam associated with access link communications, among other benefits. For example, the UE communications manager 710 may establish an access link with a base station using one or more of a first beam or a first set of beams, receive, via the access link, control signaling indicating a first configuration for a sidelink channel, switch from the first configuration to a second configuration for the sidelink channel based on detection of an event for one or more of the first beam or the first set of beams, and communicate with a second UE via the sidelink channel using the second configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases, the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor 740 to perform various functions described herein. In some cases, the memory 730 may contain, among other things, a BIOS which may control basic hardware or software operation such as the interaction with peripheral components or devices. The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting triggering resource allocation configuration switching for sidelink communications).

Figure 8:
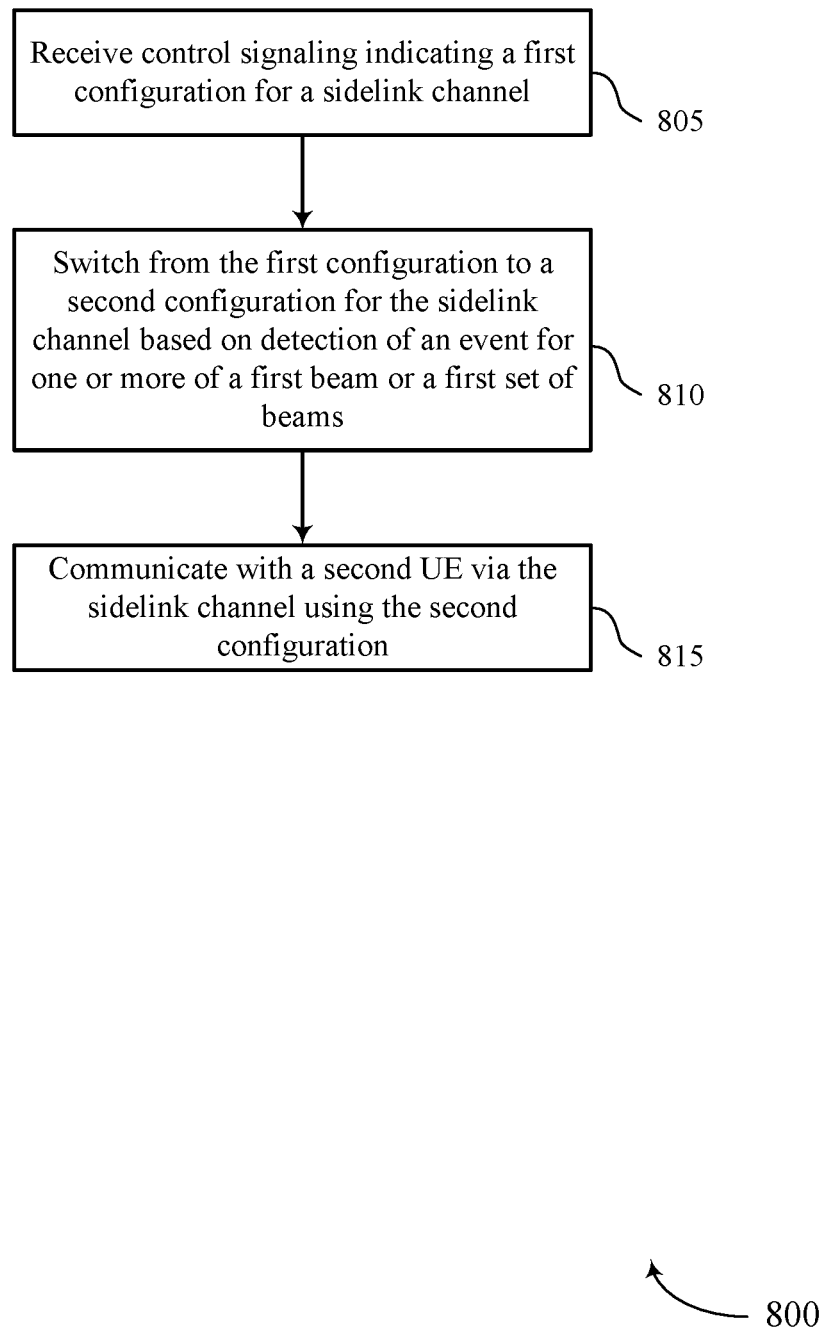
FIGS. 8 through 10 show flowcharts illustrating methods that support triggering resource allocation configuration switching for sidelink communications in accordance with aspects of the present disclosure.

FIG. 8 shows a flowchart illustrating a method 800 that supports triggering resource allocation configuration switching for sidelink communications in accordance with aspects of the present disclosure. The operations of method 800 may be implemented by a UE 115 or its components as described herein. For example, the operations of method 800 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may receive control signaling indicating a first configuration for a sidelink channel. The operations of 805 may be performed according to the methods described herein. In some examples, aspects of the operations of 805 may be performed by a configuration component as described with reference to FIGS. 4 through 7.

At 810, the UE may switch from the first configuration to a second configuration for the sidelink channel based on detection of an event for one or more of a first beam or a first set of beams. The operations of 810 may be performed according to the methods described herein. In some examples, aspects of the operations of 810 may be performed by a configuration component as described with reference to FIGS. 4 through 7.

At 815, the UE may communicate with a second UE via the sidelink channel using the second configuration. The operations of 815 may be performed according to the methods described herein. In some examples, aspects of the operations of 815 may be performed by a communication component as described with reference to FIGS. 4 through 7.

Figure 9:
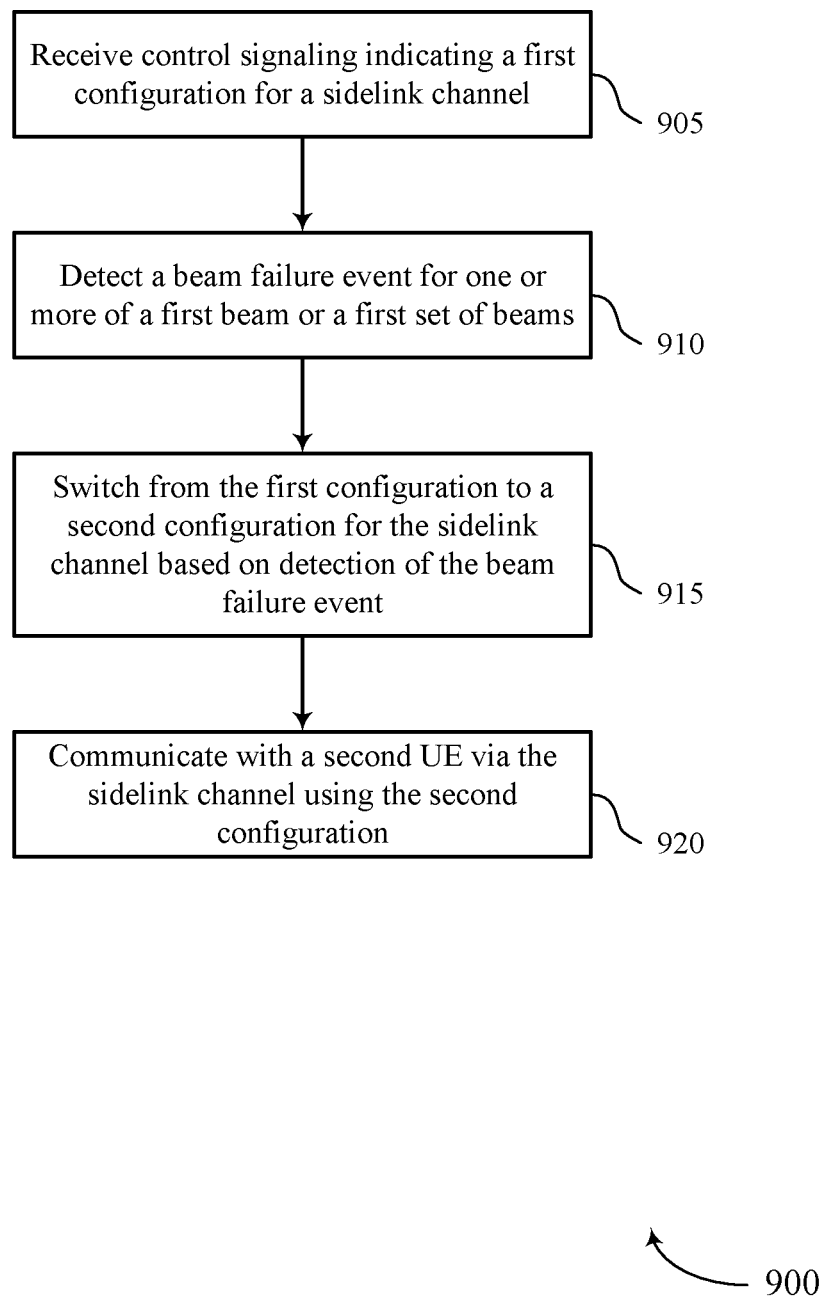

FIG. 9 shows a flowchart illustrating a method 900 that supports triggering resource allocation configuration switching for sidelink communications in accordance with aspects of the present disclosure. The operations of method 900 may be implemented by a UE 115 or its components as described herein. For example, the operations of method 900 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may receive control signaling indicating a first configuration for a sidelink channel. The operations of 905 may be performed according to the methods described herein. In some examples, aspects of the operations of 905 may be performed by a configuration component as described with reference to FIGS. 4 through 7.

At 910, the UE may detect a beam failure event for one or more of a first beam or a first set of beams. The operations of 910 may be performed according to the methods described herein. In some examples, aspects of the operations of 910 may be performed by a beam component as described with reference to FIGS. 4 through 7.

At 915, the UE may switch from the first configuration to a second configuration for the sidelink channel based on detection of the beam failure event. The operations of 915 may be performed according to the methods described herein. In some examples, aspects of the operations of 915 may be performed by a configuration component as described with reference to FIGS. 4 through 7.

At 920, the UE may communicate with a second UE via the sidelink channel using the second configuration. The operations of 920 may be performed according to the methods described herein. In some examples, aspects of the operations of 920 may be performed by a communication component as described with reference to FIGS. 4 through 7.

Figure 10:
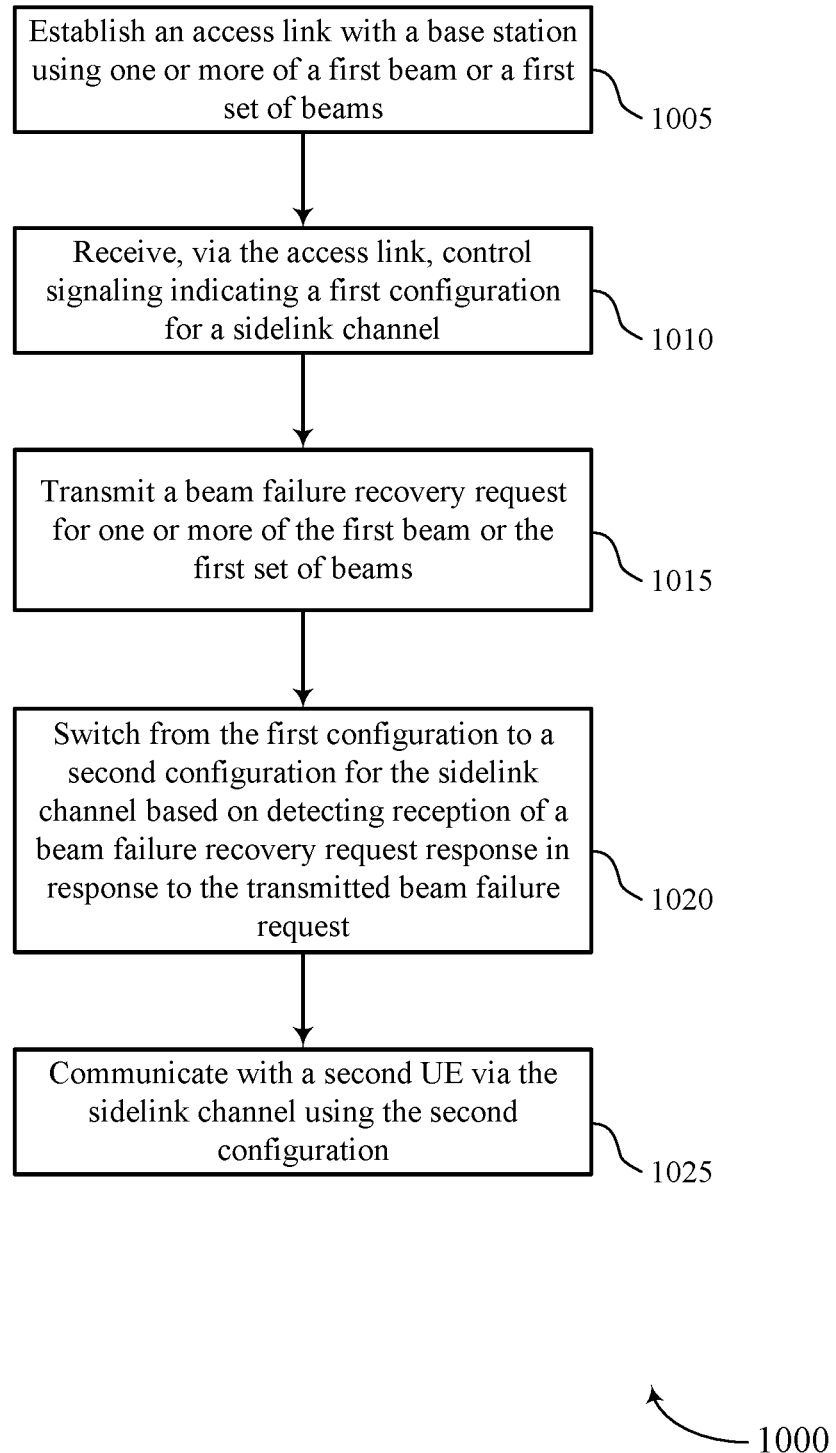

FIG. 10 shows a flowchart illustrating a method 1000 that supports triggering resource allocation configuration switching for sidelink communications in accordance with aspects of the present disclosure. The operations of method 1000 may be implemented by a UE 115 or its components as described herein. For example, the operations of method 1000 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may establish an access link with a base station using one or more of a first beam or a first set of beams. The operations of 1005 may be performed according to the methods described herein. In some examples, aspects of the operations of 1005 may be performed by an establishment component as described with reference to FIGS. 4 through 7.

At 1010, the UE may receive, via the access link, control signaling indicating a first configuration for a sidelink channel. The operations of 1010 may be performed according to the methods described herein. In some examples, aspects of the operations of 1010 may be performed by a configuration component as described with reference to FIGS. 4 through 7.

At 1015, the UE may transmit a beam failure recovery request for one or more of the first beam or the first set of beams. The operations of 1015 may be performed according to the methods described herein. In some examples, aspects of the operations of 1015 may be performed by a beam component as described with reference to FIGS. 4 through 7.

At 1020, the UE may switch from the first configuration to a second configuration for the sidelink channel based on detecting reception of a beam failure recovery request response in response to the transmitted beam failure request. The operations of 1020 may be performed according to the methods described herein. In some examples, aspects of the operations of 1020 may be performed by a configuration component as described with reference to FIGS. 4 through 7.

At 1025, the UE may communicate with a second UE via the sidelink channel using the second configuration. The operations of 1025 may be performed according to the methods described herein. In some examples, aspects of the operations of 1025 may be performed by a communication component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first user equipment (UE), comprising:
    a processor,
    memory coupled with the processor; and
    instructions stored in the memory and executable by the processor to cause the apparatus to:
        establish an access link with a network entity;
        receive, via the access link, control signaling indicating a first configuration for a sidelink;
        communicate with a second UE via the sidelink in accordance with the first configuration; and
        communicate with the second UE via the sidelink using a second configuration based at least in part on an event associated with the access link.

2. The apparatus of claim 1, wherein the instructions are further executable by the processor to cause the apparatus to:
    perform sidelink communications with the second UE using one or more sidelink resources.

3. The apparatus of claim 2, wherein to perform the sidelink communications with the second UE using the one or more sidelink resources is based at least in part on a sidelink mode, and wherein the sidelink mode comprises a first sidelink mode associated with the first configuration or a second sidelink mode associated with the second configuration.

4. The apparatus of claim 3, wherein the instructions are further executable by the processor to cause the apparatus to:
    receive control signaling indicating an allocation of the one or more sidelink resources to use for the sidelink communications with the second UE via the sidelink based at least in part on the first sidelink mode.

5. The apparatus of claim 3, wherein the instructions are further executable by the processor to cause the apparatus to:
    perform the sidelink communications with the second UE using the one or more sidelink resources that are selected from a set of sidelink resources based at least in part on the second sidelink mode.

6. The apparatus of claim 1, wherein the event is a beam failure event associated with the access link.

7. The apparatus of claim 1, wherein the instructions are further executable by the processor to cause the apparatus to:
transmit a beam failure recovery request, wherein the event comprises transmitting the beam failure recovery request.

8. The apparatus of claim 7, wherein the instructions are further executable by the processor to cause the apparatus to:
switch from the second configuration to the first configuration for the sidelink based at least in part on a beam failure recovery request response.

9. The apparatus of claim 1, wherein the instructions are further executable by the processor to cause the apparatus to:
detect the event on at least one of a primary cell, a primary secondary cell, or a secondary cell associated with the access link.

10. The apparatus of claim 1, wherein the instructions are further executable by the processor to cause the apparatus to:
switch from the first configuration to the second configuration for the sidelink based at least in part on the event associated with the access link.

11. A method for wireless communications by a first user equipment (UE), comprising:
establishing an access link with a network entity;
receiving, via the access link, control signaling indicating a first configuration for a sidelink;
communicating with a second UE via the sidelink in accordance with the first configuration; and
communicating with the second UE via the sidelink using a second configuration based at least in part on an event associated with the access link.

12. The method of claim 11, further comprising:
performing sidelink communications with the second UE using one or more sidelink resources.

13. The method of claim 12, wherein to perform the sidelink communications with the second UE using the one or more sidelink resources is based at least in part on a sidelink mode, and wherein the sidelink mode comprises a first sidelink mode associated with the first configuration or a second sidelink mode associated with the second configuration.

14. The method of claim 13, further comprising:
receiving control signaling indicating an allocation of the one or more sidelink resources to use for the sidelink communications with the second UE via the sidelink based at least in part on the first sidelink mode.

15. The method of claim 13, further comprising:
performing the sidelink communications with the second UE using the one or more sidelink resources that are selected from a set of sidelink resources based at least in part on the second sidelink mode.

16. The method of claim 12, wherein the event is a beam failure event associated with the access link.

17. The method of claim 12, further comprising:
transmitting a beam failure recovery request, wherein the event comprises transmitting the beam failure recovery request.

18. The method of claim 17, further comprising:
detecting the event on at least one of a primary cell, a primary secondary cell, or a secondary cell associated with the access link.

19. The method of claim 12, further comprising:
detecting the event on at least one of a primary cell, a primary secondary cell, or a secondary cell associated with the access link.

20. The method of claim 11, further comprising:
switching from the first configuration to the second configuration for the sidelink based at least in part on the event associated with the access link.

21. An apparatus for wireless communications at a first user equipment (UE), comprising:
means for establishing an access link with a network entity;
means for receiving, via the access link, control signaling indicating a first configuration for a sidelink;
means for communicating with a second UE via the sidelink in accordance with the first configuration; and
means for communicating with the second UE via the sidelink using a second configuration based at least in part on an event associated with the access link.

22. The apparatus of claim 21, further comprising:
means for performing sidelink communications with the second UE using one or more sidelink resources.

23. The apparatus of claim 22, wherein to perform the sidelink communications with the second UE using the one or more sidelink resources is based at least in part on a sidelink mode, and wherein the sidelink mode comprises a first sidelink mode associated with the first configuration or a second sidelink mode associated with the second configuration.

24. The apparatus of claim 23, further comprising:
means for receiving control signaling indicating an allocation of the one or more sidelink resources to use for the sidelink communications with the second UE via the sidelink based at least in part on the first sidelink mode.

25. The apparatus of claim 23, further comprising:
means for performing the sidelink communications with the second UE using the one or more sidelink resources that are selected from a set of sidelink resources based at least in part on the second sidelink mode.

26. The apparatus of claim 21, wherein the event is a beam failure event associated with the access link.

27. The apparatus of claim 21, further comprising:
means for transmitting a beam failure recovery request, wherein the event comprises transmitting the beam failure recovery request.

28. The apparatus of claim 27, further comprising:
means for detecting the event on at least one of a primary cell, a primary secondary cell, or a secondary cell associated with the access link.

29. The apparatus of claim 21, further comprising:
means for switching from the first configuration to the second configuration for the sidelink based at least in part on the event associated with the access link.

30. A non-transitory computer-readable medium storing code for wireless communications by a first user equipment (UE), the code comprising instructions executable by a processor to:
establish an access link with a network entity;
receive, via the access link, control signaling indicating a first configuration for a sidelink;
communicate with a second UE via the sidelink in accordance with the first configuration; and
communicate with the second UE via the sidelink using a second configuration based at least in part on an event associated with the access link.

* * * * *